(12) United States Patent
Fagereng

(10) Patent No.: US 11,415,098 B2
(45) Date of Patent: Aug. 16, 2022

(54) OCEAN POWER TURBINE

(71) Applicant: RANDSEA AS, Nøtterøy (NO)

(72) Inventor: Arill Fagereng, Skallestad (NO)

(73) Assignee: RANDSEA AS, Nøtterøy (NO)

( * ) Notice: Subject to any disclaimer, the term of this patent is extended or adjusted under 35 U.S.C. 154(b) by 0 days.

(21) Appl. No.: 16/308,038

(22) PCT Filed: Jun. 6, 2017

(86) PCT No.: PCT/NO2017/050149
§ 371 (c)(1),
(2) Date: Dec. 7, 2018

(87) PCT Pub. No.: WO2017/213518
PCT Pub. Date: Dec. 14, 2017

(65) Prior Publication Data
US 2019/0309725 A1    Oct. 10, 2019

(30) Foreign Application Priority Data
Jun. 10, 2016  (NO) .................................. 20160991

(51) Int. Cl.
*F03B 17/06*    (2006.01)
(52) U.S. Cl.
CPC ...... *F03B 17/066* (2013.01); *F05B 2250/314* (2013.01); *F05B 2260/72* (2013.01); *F05B 2260/76* (2013.01); *Y02E 10/20* (2013.01)
(58) Field of Classification Search
CPC ........ F03B 13/10; F03B 13/144; F03B 13/22; F03B 17/06; F03B 17/066; F03B 9/00; F03B 9/005
See application file for complete search history.

(56) References Cited

U.S. PATENT DOCUMENTS 402,055 A * 4/1889 Besemer ................. F03B 7/006
415/5
418,304 A * 12/1889 Besemer ............... F03B 17/066
416/8

(Continued)

FOREIGN PATENT DOCUMENTS

CN        1065510 A    10/1992
CN        1110761 A    10/1995

(Continued)

OTHER PUBLICATIONS

English_translation_of_the_cover_page_of_the_Chinese_examination_report dated Apr. 15, 2020; pp. 1-2.

(Continued)

*Primary Examiner* — Brian P Wolcott
(74) *Attorney, Agent, or Firm* — Birch, Stewart, Kolasch & Birch, LLP

(57) ABSTRACT

An ocean power plant for converting slow water flow energy with a turbine comprising at least one endless rotation chain (4) with a plurality of plate holders (2) along the rotation chain where the plate holder comprises at least one plate (1) attached in each plate holder, further, the rotation chain running in an extended lane around and engaging at least one drive wheel (5) in the one end arch of the web tiltably attached to the plate holder to alternate between open position with the primary flow direction of the water flow, and closed position towards the flow direction, and the drive wheel has a turbine shaft (7) coupled to a generator device (G), an electrical generator or a converter of the rotational energy to hydraulics or other type of mechanical or potential energy, for the utilization of the rotational energy, furthermore the path of the rotary chain (4) is tilted relative to the main flow direction of the water flow, all arranged in a fully or partially submersible support structure (100).

15 Claims, 16 Drawing Sheets

(56) References Cited

U.S. PATENT DOCUMENTS

| | | | | |
|---|---|---|---|---|
| 849,311 A * | 4/1907 | Auld | ............... | F03B 17/066 |
| | | | | 416/8 |
| 1,449,426 A * | 3/1923 | Loveless | ............ | F03B 17/06 |
| | | | | 415/5 |
| 1,522,820 A * | 1/1925 | Homola | ............ | F03B 17/06 |
| | | | | 415/5 |
| 4,494,008 A * | 1/1985 | Patton | ............... | F01D 23/00 |
| | | | | 290/44 |
| 7,615,883 B2 * | 11/2009 | Meheen | ............ | B60K 16/00 |
| | | | | 290/55 |
| 9,702,337 B2 * | 7/2017 | Han | ............... | F03B 17/064 |
| 2008/0247871 A1 | 10/2008 | Voves | | |

FOREIGN PATENT DOCUMENTS

| | | | | |
|---|---|---|---|---|
| CN | 204402750 U | 6/2015 | | |
| DE | 4142217 A1 * | 7/1993 | ............ | F03D 5/02 |
| FR | 690906 A | 9/1930 | | |
| JP | 2003269318 A | 9/2003 | | |
| JP | 2010242666 A | 10/2010 | | |
| JP | 2013019376 A | 1/2013 | | |
| KR | 1020040043273 A | 5/2004 | | |
| WO | WO 00/45048 A | 8/2000 | | |
| WO | WO-2017070783 A1 * | 5/2017 | ............ | E02B 9/08 |

OTHER PUBLICATIONS

Machine_translation_Japanese_Office_Action dated Apr. 26, 2021; pp. 1-8.
Norwegian Search Report dated Dec. 22, 2016; pp. 1-2.

* cited by examiner

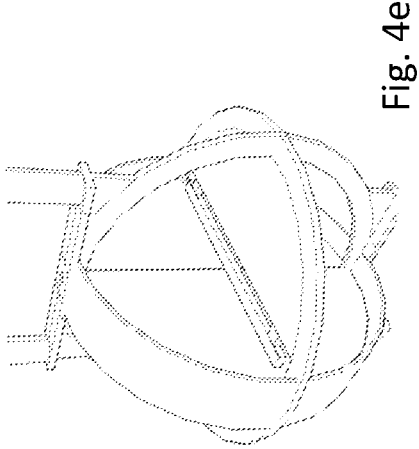
Fig. 4g
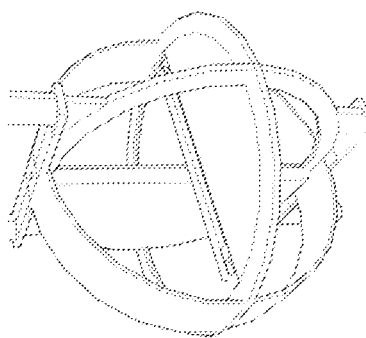
Fig. 4e
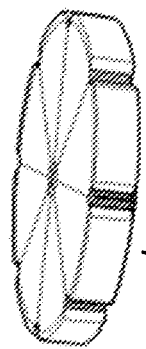
Fig. 4f
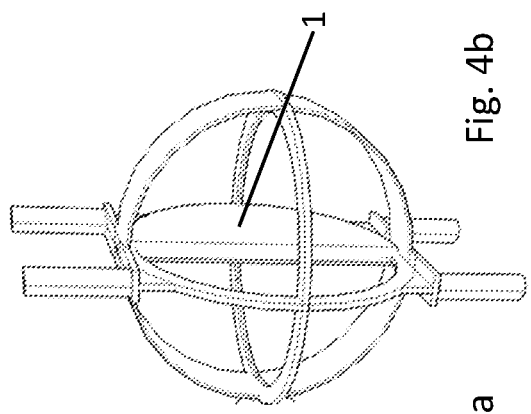
Fig. 4b
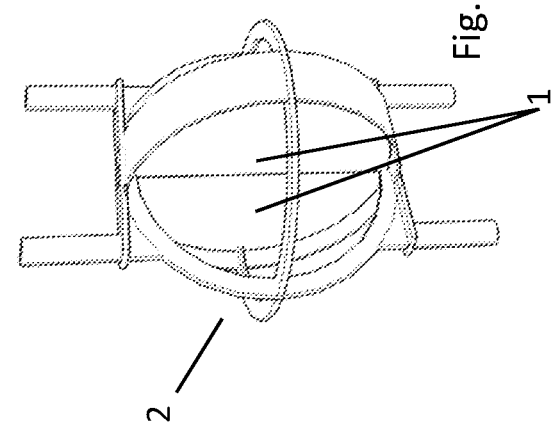
Fig. 4a
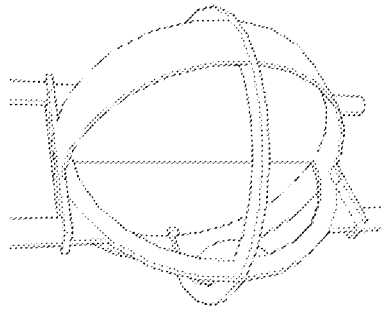
Fig. 4d
Fig. 4c

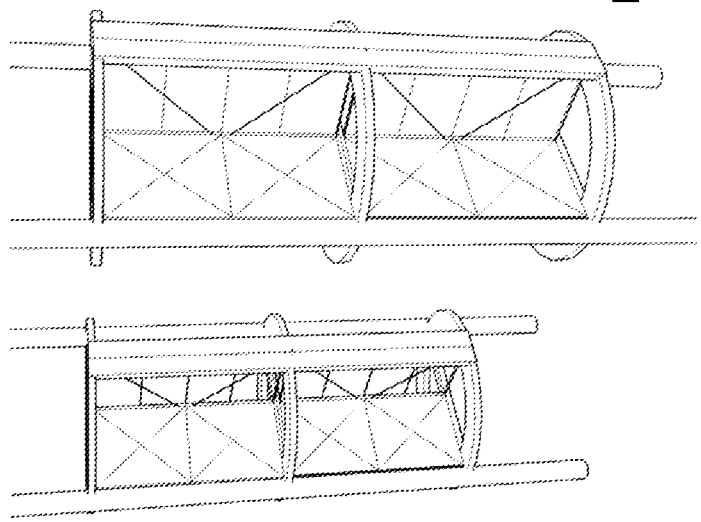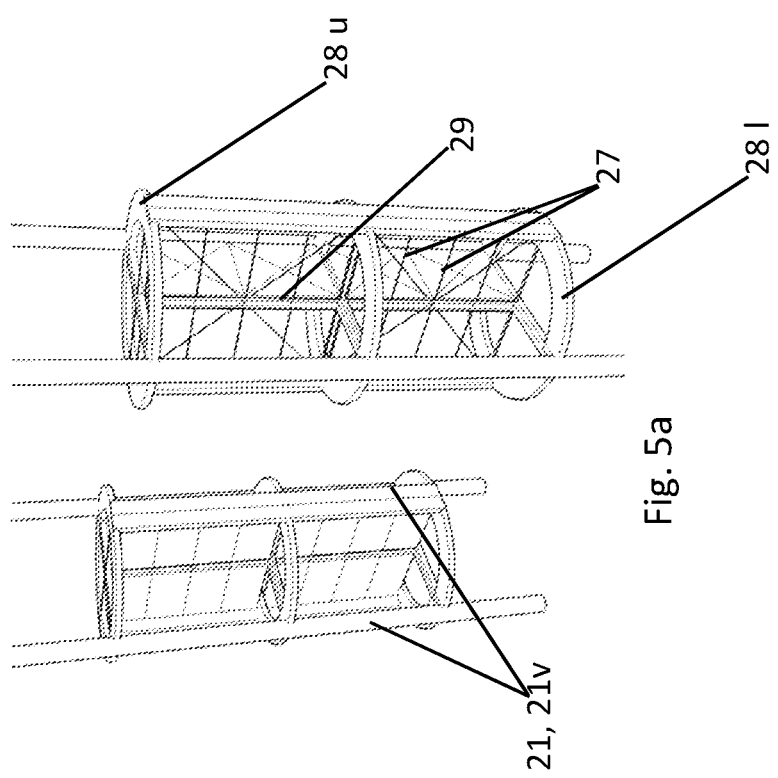
Fig. 5a
Fig. 5b
Fig. 5

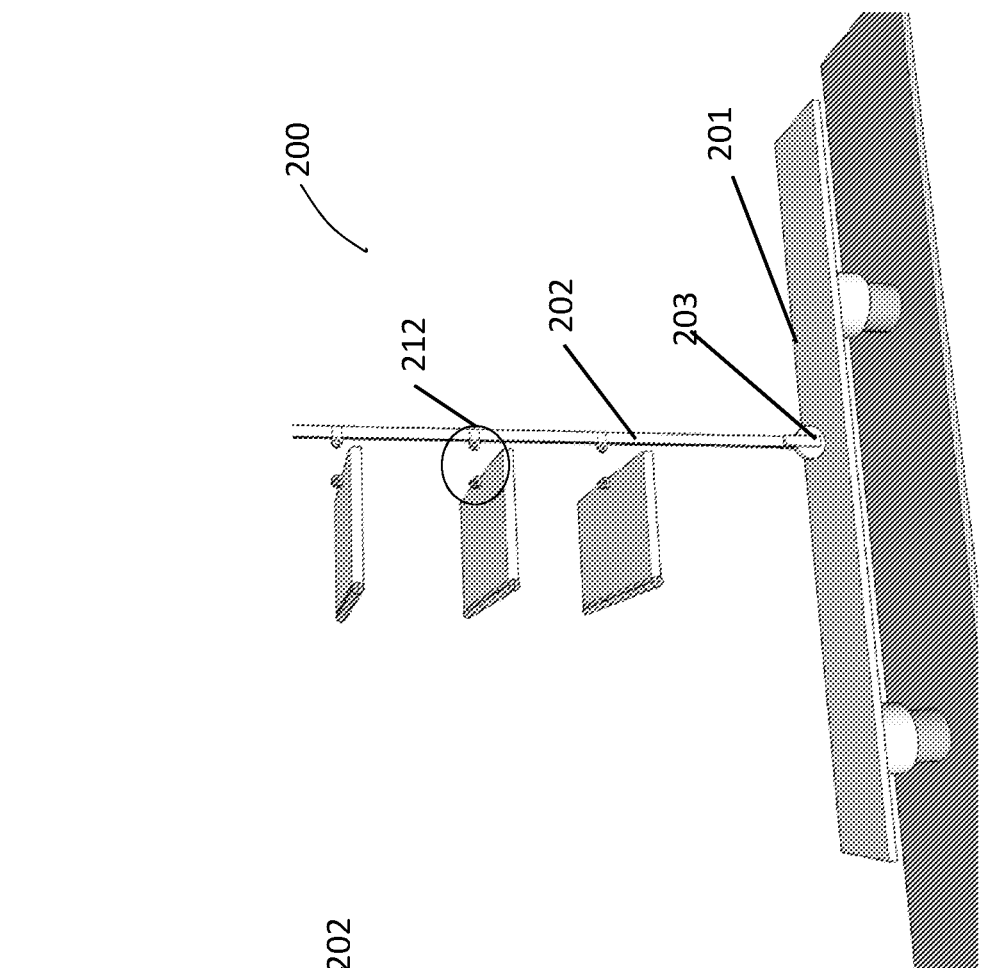
Fig. 12b
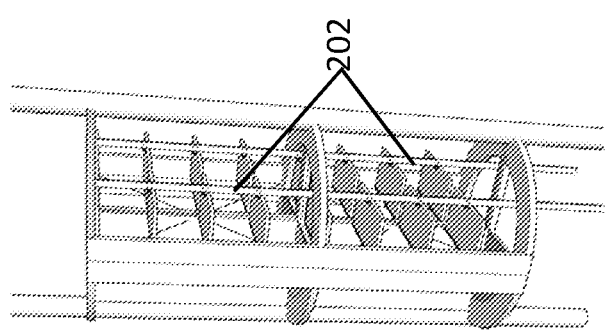
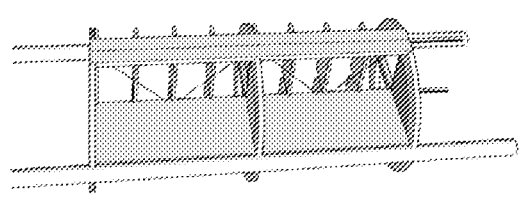
Fig. 12a

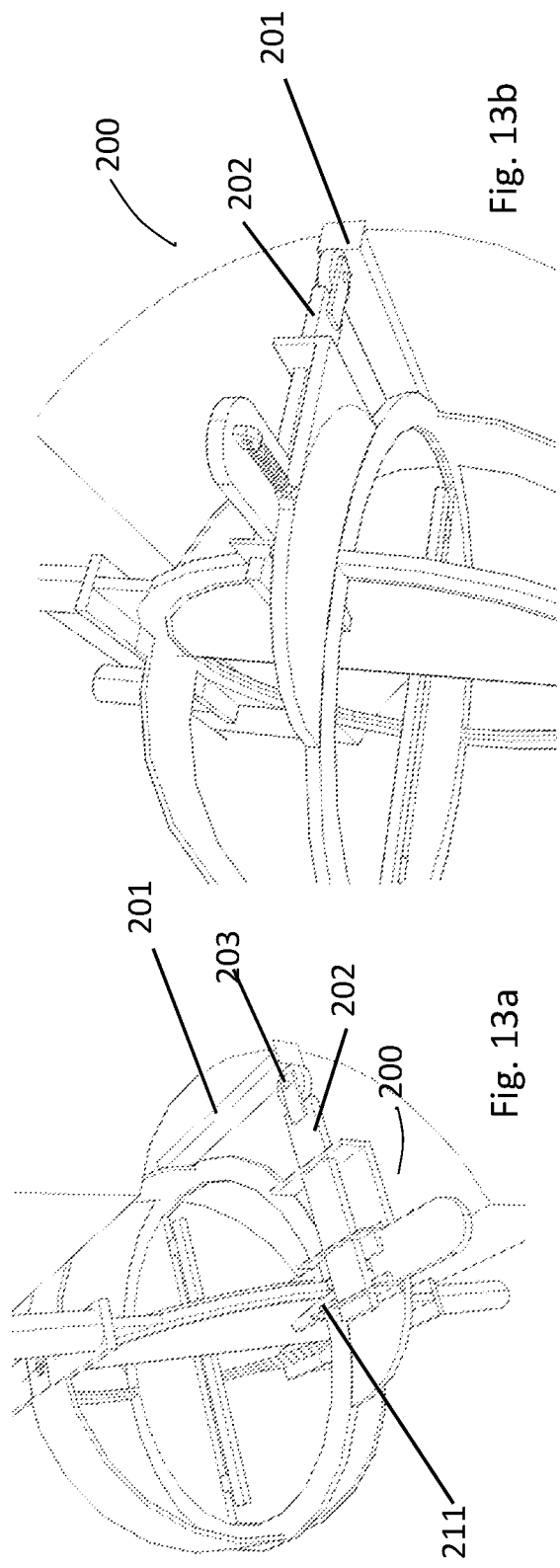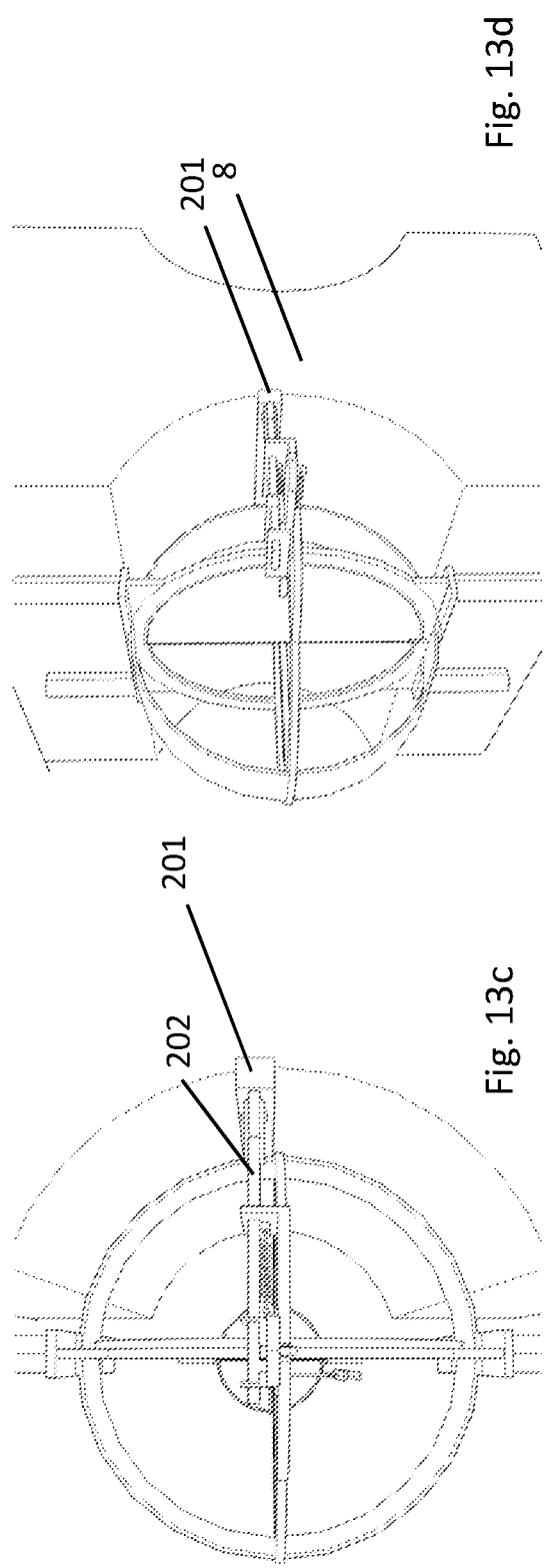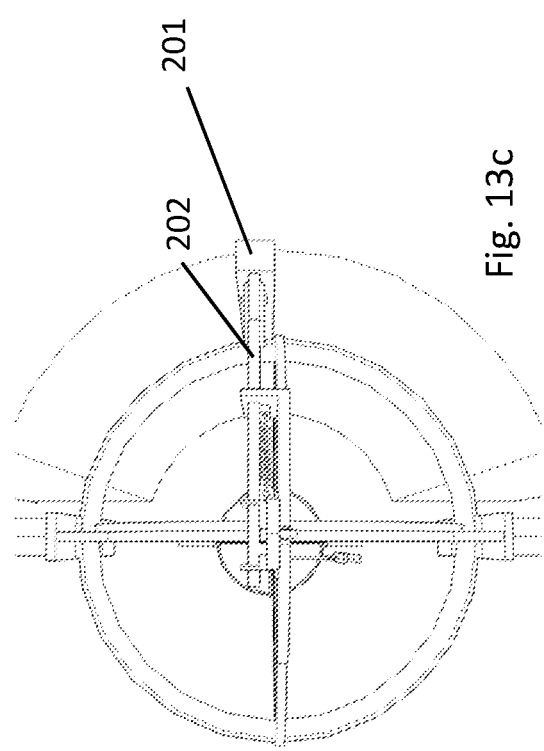

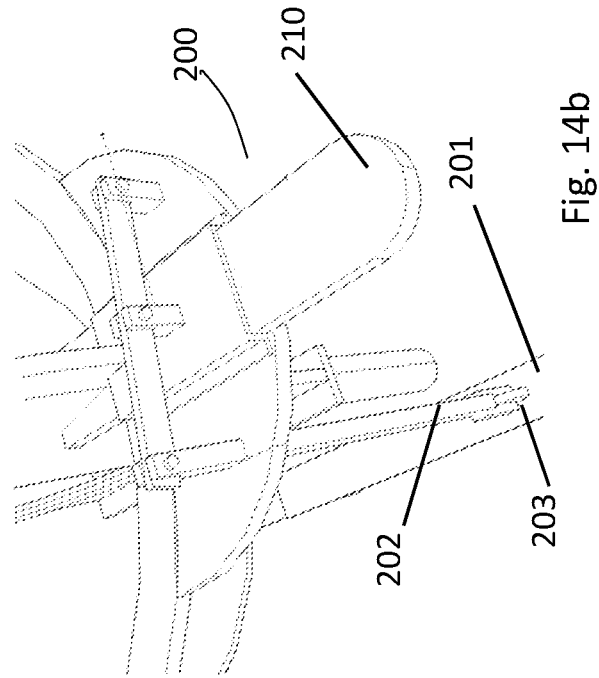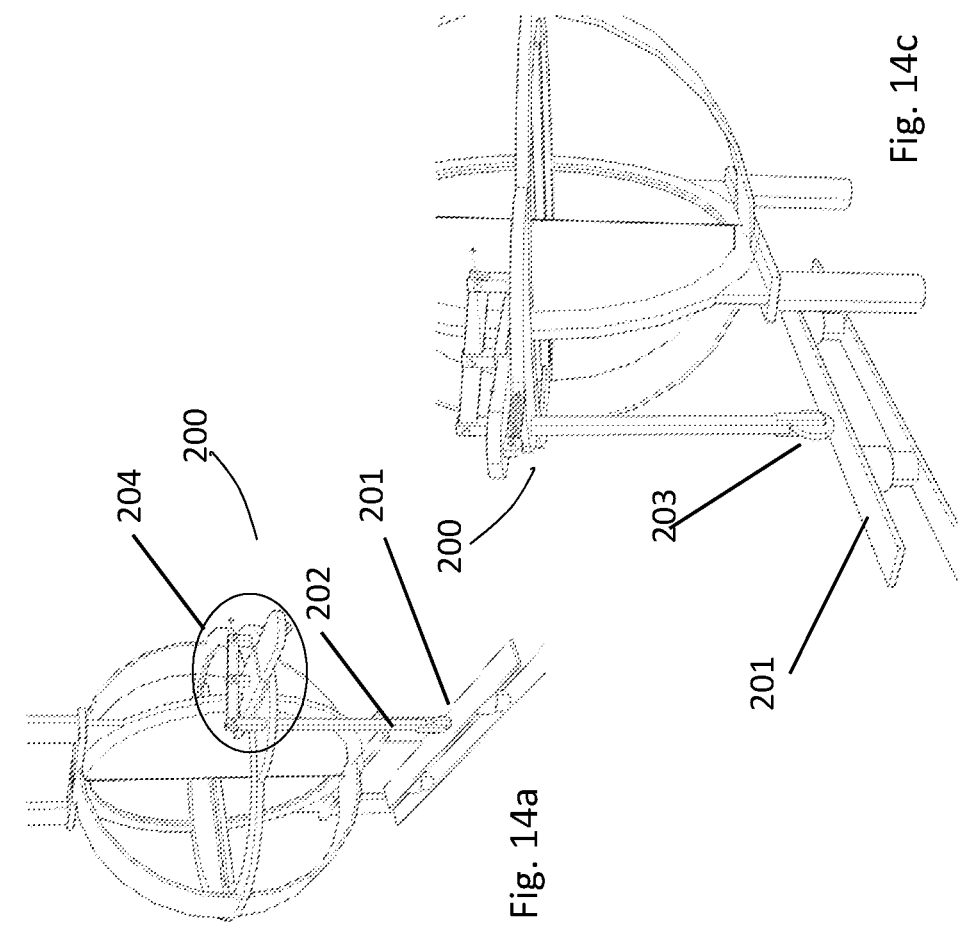

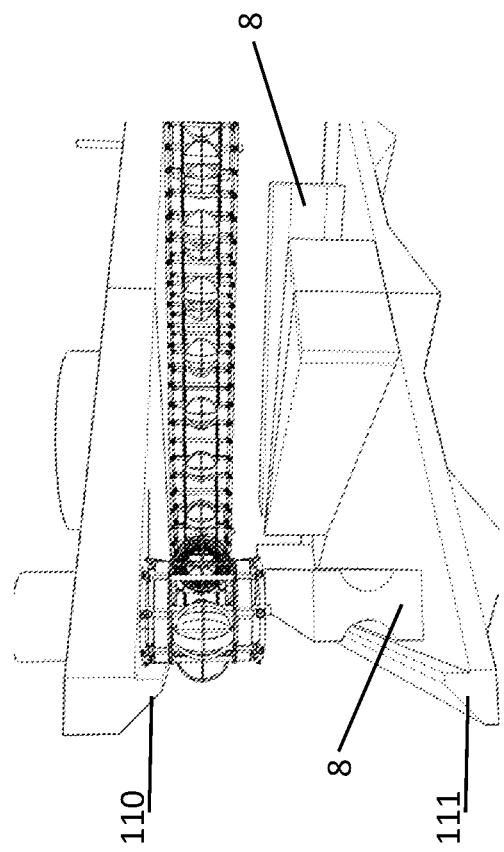
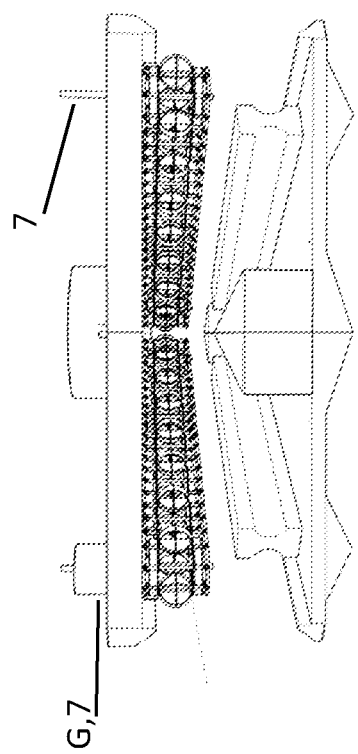
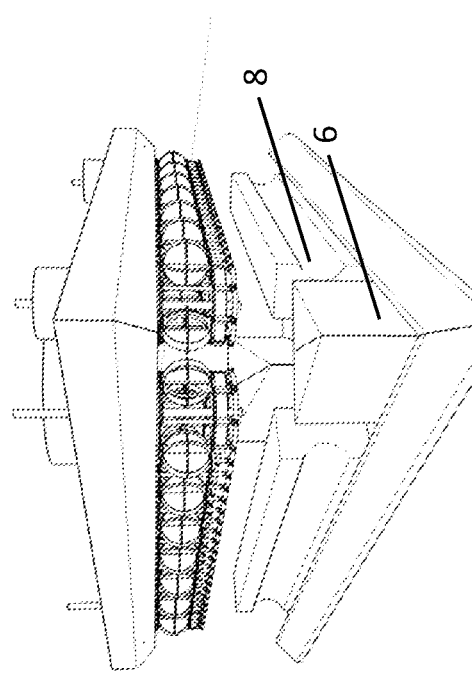
Fig. 17a
Fig. 17b
Fig. 17c

OCEAN POWER TURBINE

PRIORITY APPLICATIONS

This application is a U. S. National Stage Filing under 35 U.S.C. 371 from International Application No. PCT/N02017/050149, filed on 6 Jun. 2017 and published as WO 2017/213518 on 14 Dec. 2017, which claims the benefit of priority to Norwegian Patent Application No. 20160991 filed 10 Jun. 2016, which applications and publication are incorporated herein by referenced in their entirety.

BACKGROUND

The invention relates to an «Energy plow» converting kinetic energy from water to rotation energy.

PRIOR ART

Generally, hydropower plants are based on a river flow with a potential energy due to a water fall and are land based. These are built over large land areas with water dam and waterfalls piped to concentrate and control the energy of the water.

One of the largest energy reserves on earth is the kinetic energy in the ocean and rivers due to water stream.

Recently, there have been a number of solutions for the utilization of wave power, where it is crucial to utilize the wave's heave and lower motion, so-called wave power plants. These are, to the extent they have been tried, put into operation in landscaped, shallow areas where the waves are the largest.

There are currently projects of moving the traditional windmill down under water to utilize continuous water currents instead of waves. These must be anchored each to the seabed.

There are also described a number of endless chain turbines, Examples of such are given in DE 3346634 describing a hydropower plant with "endless chain propeller" with standing plates along stream and lying counter-current. The power plant has been shown for use in river in fully immersed operating position with generator and support functions on land. The power plant has conveyors that rotate around two or more rolls and the plates extends freely into the water in the counterstream direction.

CN 2225550Y is a similar example and relates to a system suspended in a large floating element anchored on land.

Common to such systems is that the plate structures are relatively thin and in forceful flow they will need a lot of maintenance and thus arranged close to land.

DE106401C relates to a similar variant, but here the plates run along guide rails, standing along stream and lying counter-current.

All the systems have the plates arranged consecutively and the plates absorbs the energy, mainly just after the turn of the chain and the opening of the plates.

SHORT SUMMARY OF THE INVENTION

A main purpose of the invention is to establish a power-plant for exploitation of large water streams, mainly slow flowing streams, such as ocean current and large rivers, and is an ocean current power plant for converting slow flowing water streams kinetic energy with a turbine comprising.

- at least one endless rotation chain having a plurality of plate holders arranged in the rotation chain, each plate holder comprising at least one plate attached in each plate holder, where said rotating chain runs in an extended path around and engages with at least one drive wheel in the one end arch of the path by means of at least one engagement device

- further each plate is pivotably attached to the plate holder to switch between the open position with the primary flow direction of the water flow and closed position towards the flow direction and
- the drive wheel has a turbine shaft coupled to a generator device for utilizing the rotational energy, further
- the path of the rotation chain slanted relative to the main flow direction of the flow of water, all arranged in a fully or partially submersible support structure. In an embodiment, it is arranged a water spreading plow and the support structure may also be arranged with collective walls. Advantages to the invention is that it utilizes renewable energy represented by flow in large water streams. At the same time, the invention is arranged for exploitation of the water flow speed in the complete concurrent flow extension of the rotation chain. When the spreading plow is arranged the water pressure and speed accelerate along the concurrent side and increase the effect. Collective walls to the concurrent side will contribute further. At the same time, the spreading plow walls will shield the counter-current motion and reduce the effect loss in the counter-current lane.

The power plant will be a huge structure but a compact plant with all necessary support operations at the same structure. The power plant will be arranged far form land and utilize unused sea areas today and the risk of contamination is minimal compared to an oil platform. There is no need for land facility for receiving energy. The facility is also removable.

SHORT FIGURE CAPTION

The attached figures illustrate some embodiments of the claimed invention FIG. 1 shows a perspective view of an embodiment of the invention without any support structure on top.

FIG. 4a is a detailed view of a circular plate holder (2) embodiment with two circle halves shaped plates (1) in an open position.

FIG. 4b is a detailed view of a circular embodiment of the plate holder (2) with the two semi-circular plates (1) in the closed position.

FIGS. 4c, d and e show detailed views of various embodiments of circular plate holders with stoppers for the open position of the plates. In FIG. 4d the plates are in the closed position.

FIG. 4f is a detailed perspective view of the drive wheel (5) according to an embodiment of the invention.

FIG. 4g is a detailed view of an embodiment of the gripping and sliding device (23).

FIGS. 5a and 5b are detailed views of an embodiment of the invention with a cylindrical rectangular plate holder (2) with square plates (2) in an open and closed position and with a craft structure to stiffen the structure and provide hold strength against the driving forces of the ocean flow.

Figure 6:
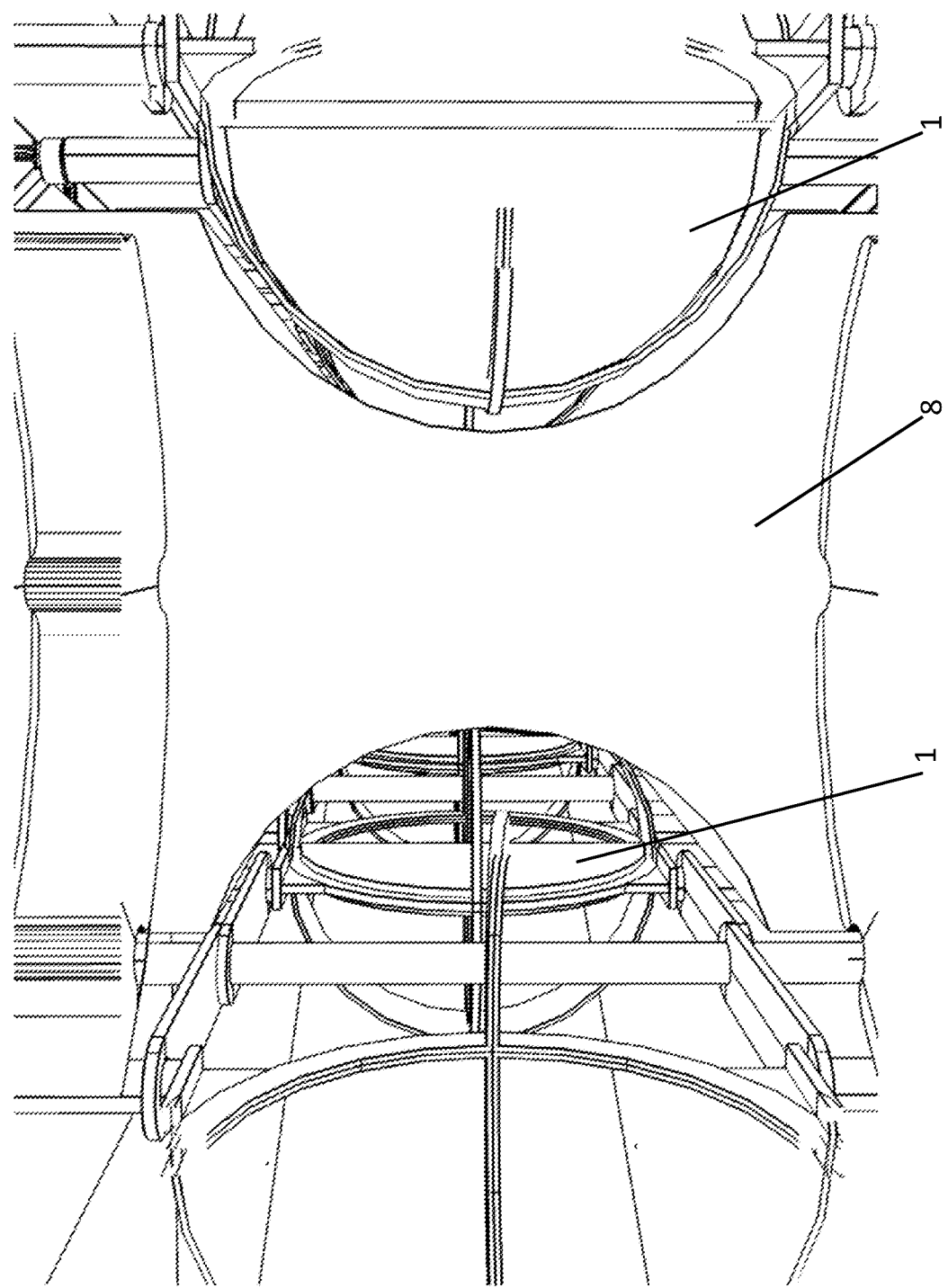

FIG. 6 is a detailed view of the invention seen from behind, and shows the left plates (1) in an open position and to the right they are illustrated in a closed position. In the middle one may see the partition wall (8).

Figure 7:
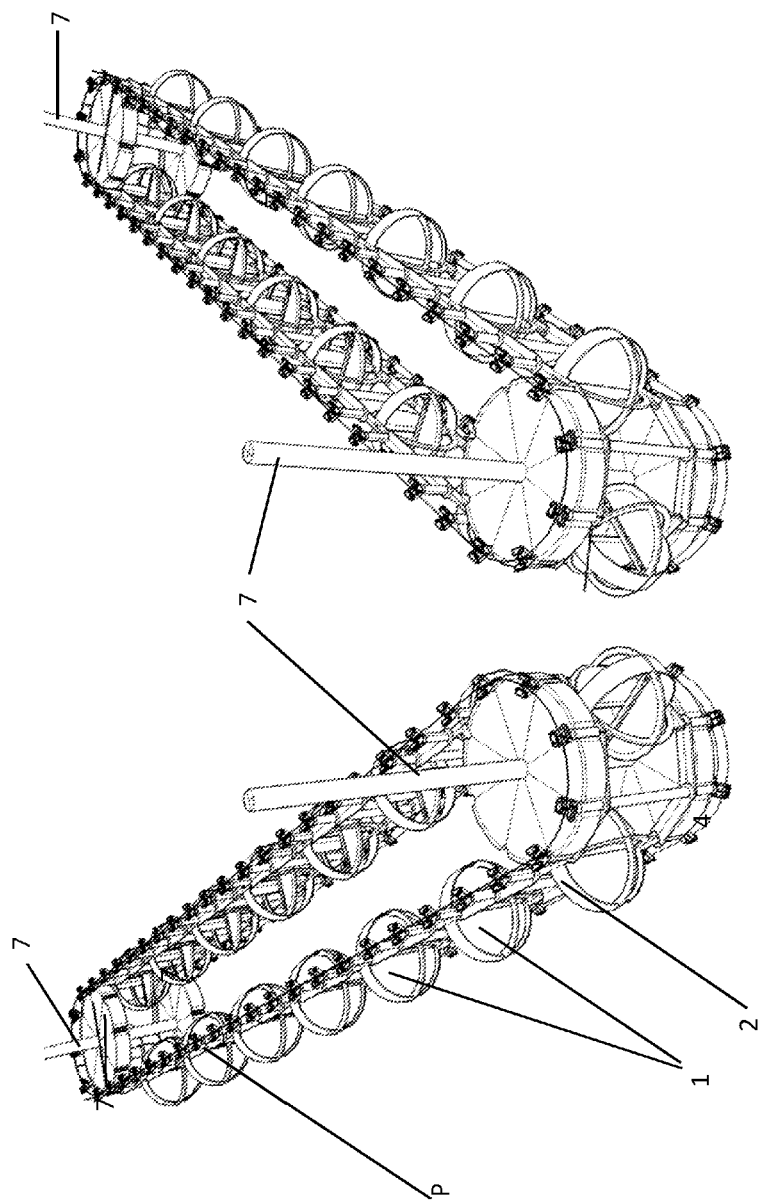

FIG. 7 shows an embodiment according to the invention of the endless chain turbine wheel without a support structure or other surrounding structure.

Figure 8:
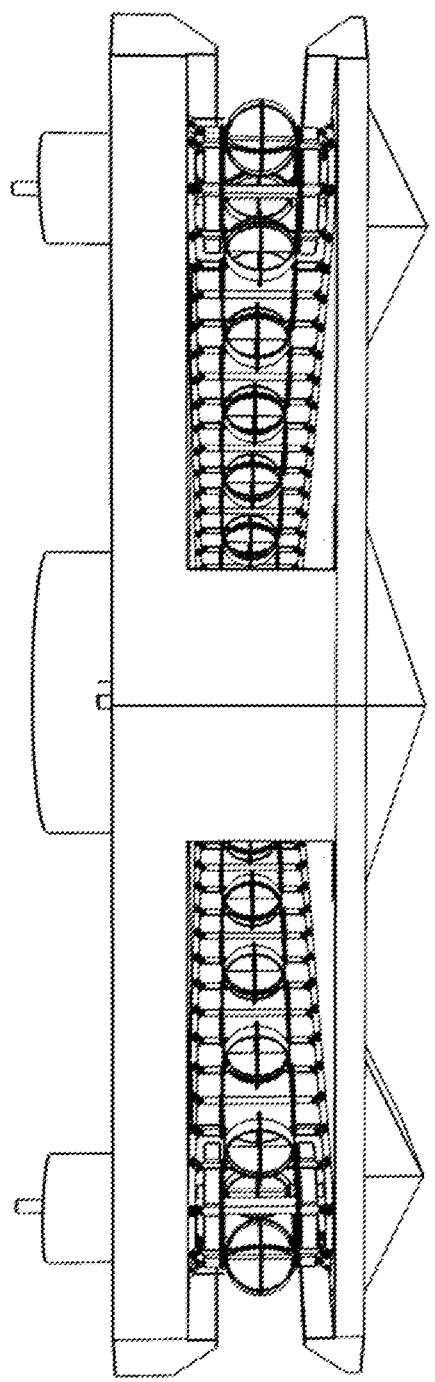

FIG. 8 shows the power plant according to an embodiment of the invention from behind.

Figure 9:
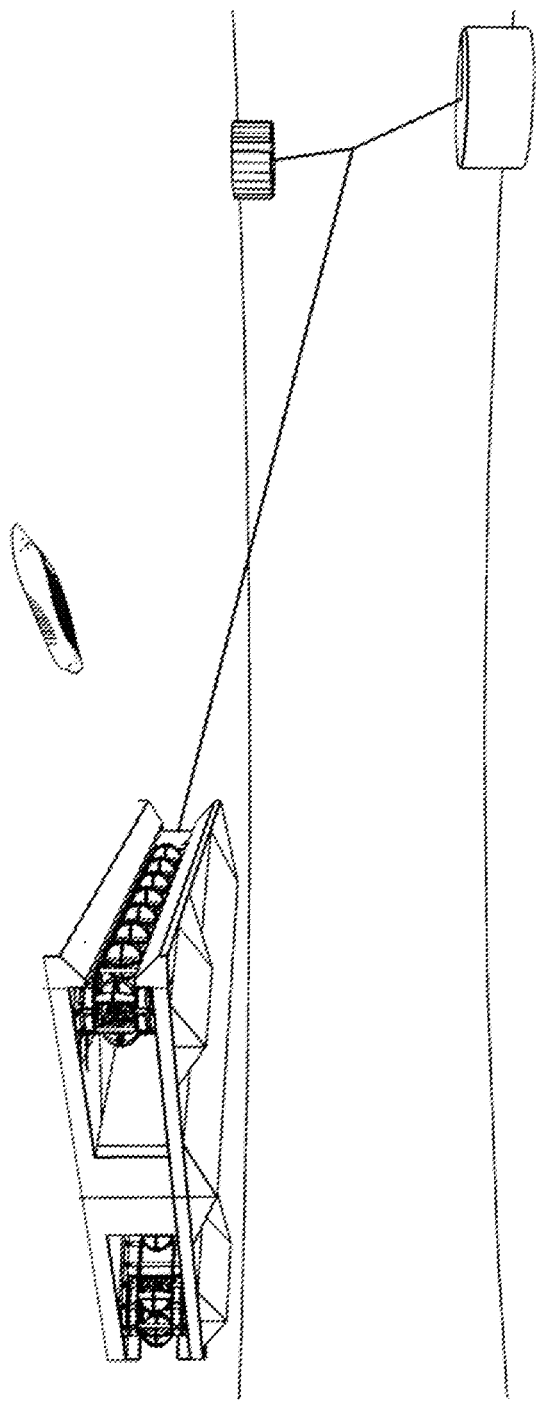

FIG. 9 is an illustration of the powerplant according to the invention anchored to the sea bed and seen from below.

Figure 10:
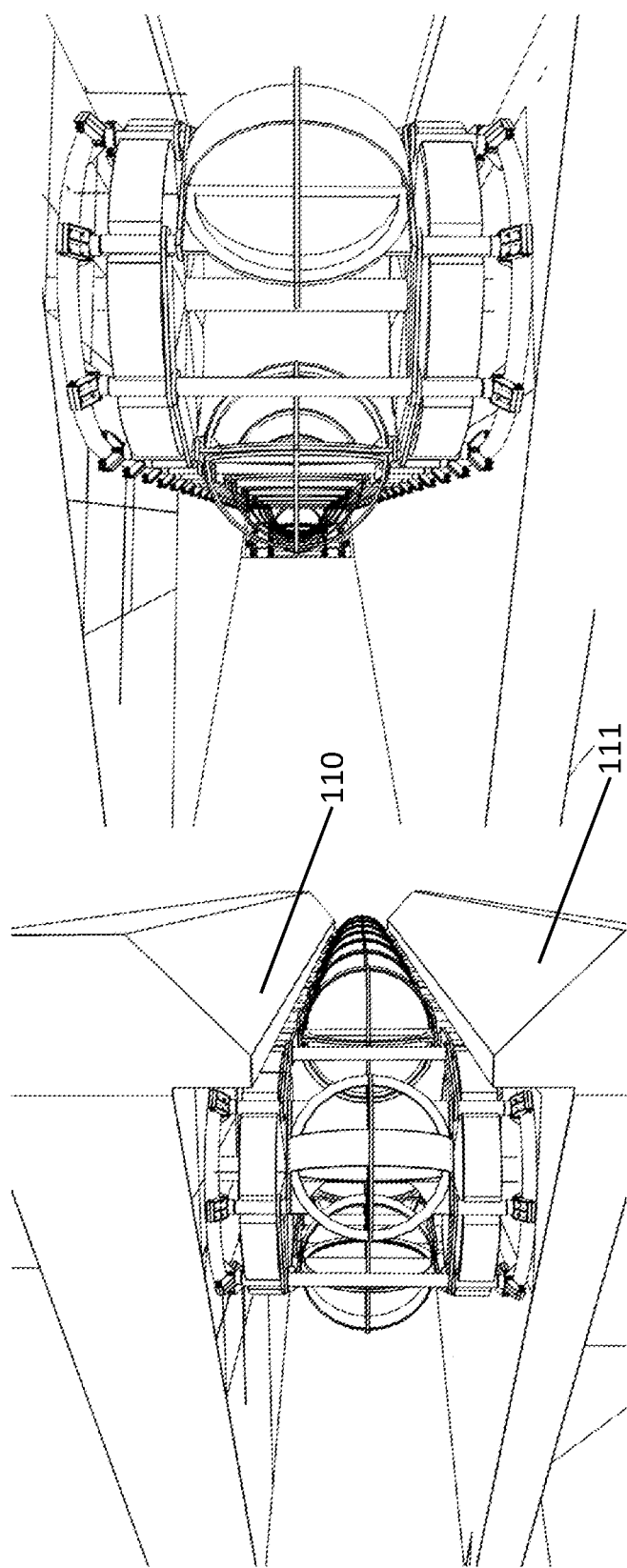

FIG. 10 shows two detail views from behind of an embodiment of the invention wherein the left figure is seen obliquely from the outside and shows the sloping walls on the upper and lower support structure accordingly, and to the right is the detail view seen obliquely from the inside.

Figure 11A:
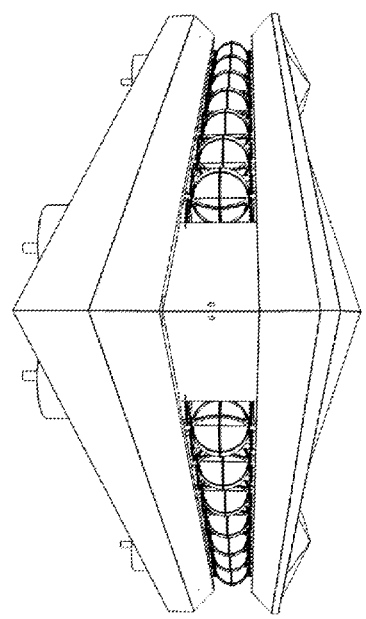

FIG. 11a shows the power plant according to an embodiment of the invention the in a perspective front view in the way the ocean current meets the powerplant.

Figure 11B:
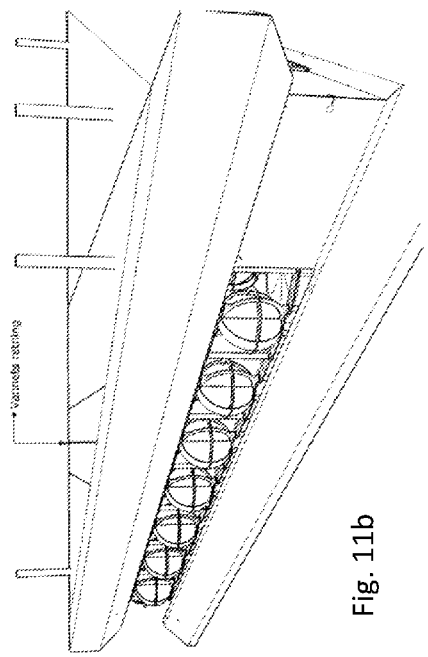

FIG. 11b shows the water attack point to the rotation chains extended lane arranged in a 30-degree angled to the main stream direction of the water.

FIG. 12a shows a view of a stop system with an arrangement for holding the plates in a closed position according to an embodiment of the invention related to squared pates in the plate holder. The plates are shown in a stop position, open position and activated stop system.

FIG. 12b shows the embodiment of FIG. 12 without plate holder and in an extended view.

FIG. 13a shows a view of a stop system with an arrangement to hold the plates in a closed position according to an embodiment of the invention engaging the half-moon shaped plates in a perspective view form above and with the lifting balk arranged in the partition wall (8).

FIG. 13b shows a perspective vies seen from below of the same embodiment as in FIG. 13a.

FIG. 13c shows the same embodiment seen in rear view.

FIG. 13d show a similar embodiment seen in a side perspective view.

FIG. 14a shows a perspective view of an embodiment with circular plate holders and a stop system according to an embodiment of the invention and wherein the lifting beam (201) is arranged under the plate holder.

FIGS. 14b and c shows the same embodiment in different perspective views.

Figure 15:
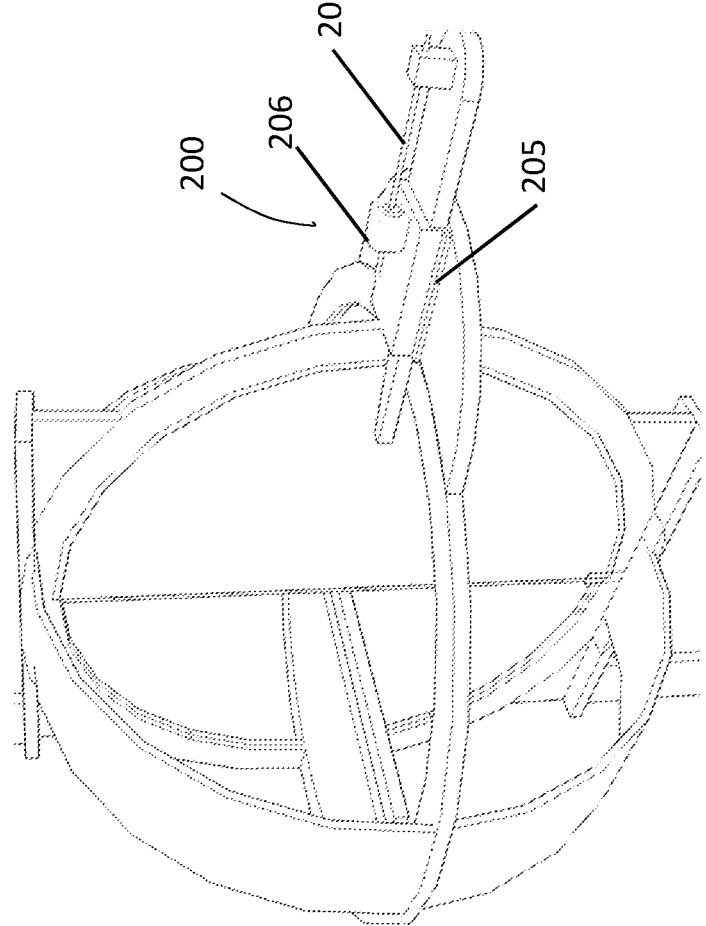

FIG. 15 shows a stop system according to an embodiment of the invention with a device (200) to hold the plates in a closed position comprising a motor (206) and a drive shaft rod (207). Arrangement for batteries and remote control is not illustrated in the figure.

Figure 16:
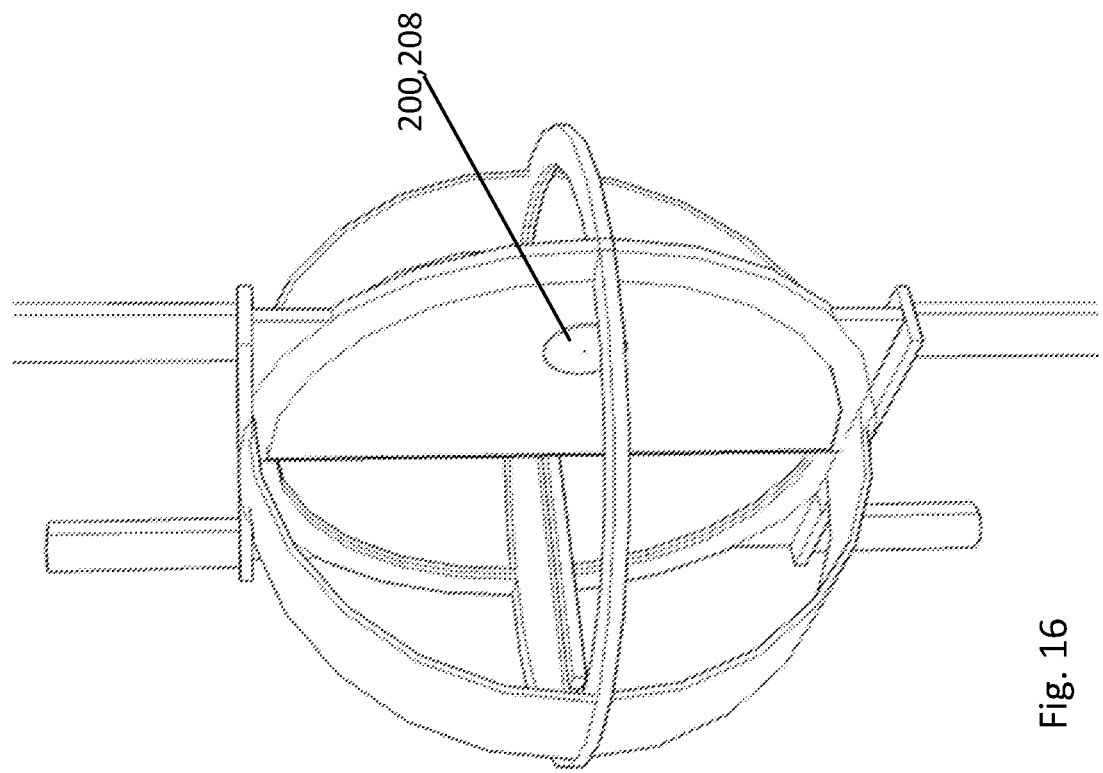

FIG. 16 shows a stop system according to an embodiment of the invention with a device (200) to hold the plates in a closed position comprises a magnet (208). Arrangement for batteries and remote control is not illustrated in the figure.

FIG. 17a shows a partly extended view in a perspective front view and shows some details of an embodiment the invention.

FIGS. 17b and c shows a view of a similar embodiment in an extending rear view and perspective rear view.

EMBODIMENTS OF THE INVENTION

The invention will in the following be described and embodiments of the invention will be described in accordance to the belonging figures. The invention is an ocean power turbine (0) for converting a slow water flow energy comprising at least one endless rotation chain (4) having a plurality of plate holders (2) arranged in the rotation chain (4), each plate holder (2) comprising at least one plate (1) attached in each plate holder (2), where said rotating chain runs in an extended path (P) around and engages with at least one drive wheel (5) in the one end arch (B) of the path by means of at least one engagement device, further each plate (1) is pivotably attached to the plate holder (2) to switch between the open position with the primary flow direction (F) of the water flow and closed position towards the primary flow direction (F), and the drive wheel (5) has a turbine shaft (7) coupled to a generator device (G) for utilizing the rotational energy, further the path (P) of the rotation chain (4) slanted relative to the primary flow direction (F), all arranged in a fully or partially submersible support structure (100). This will be provided in a corresponding machine room that can accommodate, as required, gear, generator, brake, transformer, control and control systems, etc.

By ocean currents, it is meant large water masses at relatively low speeds, i.e. without water fall height. For example, the Gulf Stream can have a typical maximum speed of 2.5 m/s, and other ocean currents or rivers down to maximum speeds of about 0.1 m/s, but the turbine can extract kinetic energy at both low and high flow rates. It is advantage that the turbine is submersible and that the energy can be transferred to the surface in another form. Some ocean currents may have their speed at a deeper depth than in the surface. In addition, it is advantageous, if the turbine is located in a large river, that it can be removed from the surface, for example laid on the riverbed and not be neither destructive nor obstructive to traffic on the river.

The ocean power turbine may transfer kinetic energy from seas, oceans, rivers and air with the flow (co-current) that transfers into rotational energy, and returns against the flow (counter-current) at a lowest possible resistance.

The ocean power turbine comprises plates/flaps with its main area in the co-current flow and which returns with as minimal cross section area in a counter-current transportation.

The ocean power turbine comprises a frame as the main support structure (100). Inside the frame there are arranged turbine shafts (7). At each turbine shaft (7) wheels or rollers (5). Between the wheels/rollers there are running a wire or a chain (4, 41) absorbing the energy from the plates/flaps (1) to the wheels/rollers (5) and to the turbine shafts (7).

The energy is harvested at two or more of the turbine shafts (7), and may for instance run a generator (G) to produce electricity, to produce Hydrogen gas, car/else other.

The ocean power turbine may be designed in all sizes, from micro size to macro size, limited in size of material strength and physical construction limitation, and limited down to size of practical needs.

Figure 1:
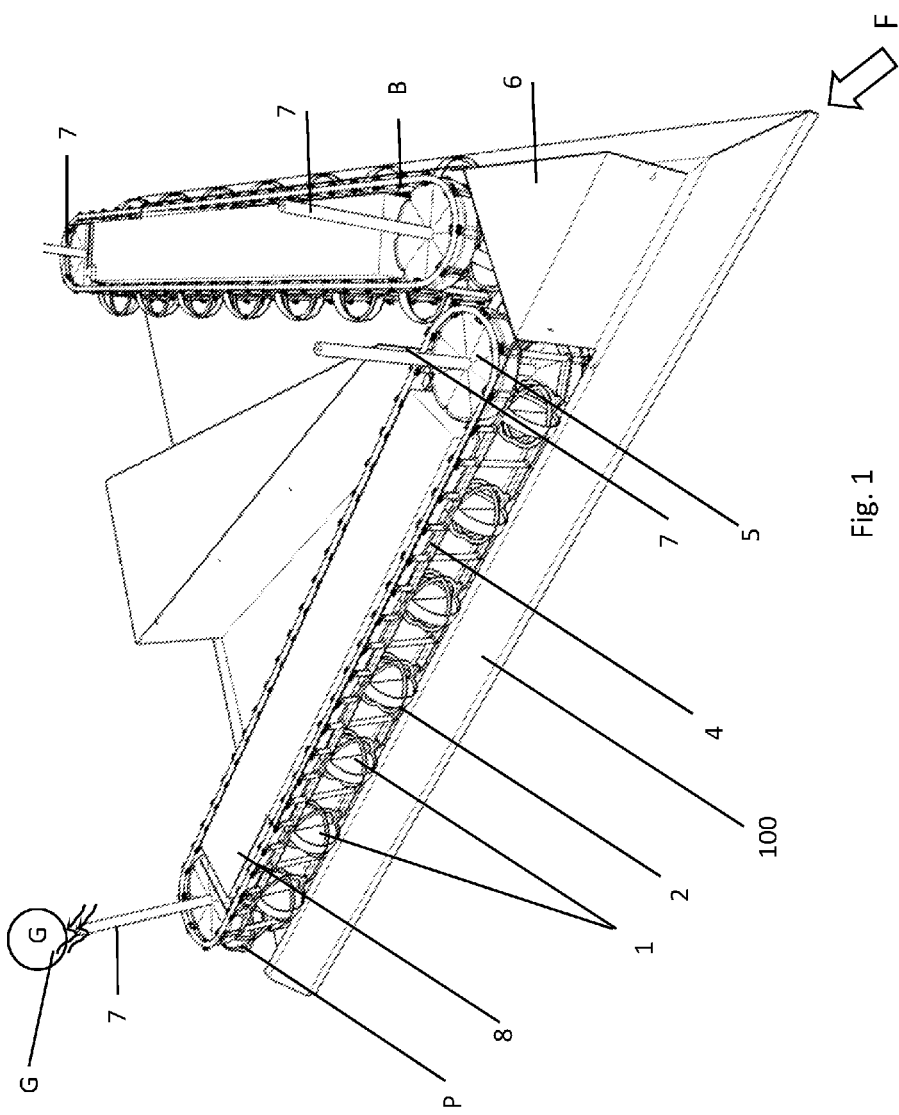

The ocean power turbine comprises a support structure. This holds the movable "conveyors" constituting the turbine wheel, the operating structure (1, 2, . . . ) and which is arranged in a relative angle to each other in the area 0 to 90 degrees, please see FIG. 1. FIG. 1 shows an embodiment of the invention wherein the angle is 30 degrees related to the water stream.

The main structure may be mounted at the sea bed, ocean bed or river bed. The frame may also be equipped with a buoyance tanks facilitating maintenance and transport since it may then be lifted and lowered in the sea.

Floating in the water the ocean power turbine must be anchored to the ocean, sea or river bed. The anchoring may be performed directly from the platform to the bottom, or to sea bed anchored "floats".

The kinetic energy transfers to rotational energy by the plates/flaps (1) which is arranged with its largest area down into the current of the primary flow direction (F), in next turn to counter-current with its smallest cross section area to achieve less possible resistance. The plates are flaps that opens co-current and closes counter-current.

The plates (1) is arranged perpendicular to the rotation chain (4) which forms another angle related to the water current, so the water advantageous meets more plates at the same time. The embodiment illustrated in FIG. 1 shows a 30 degree relation to the primary flow direction (F) in the water, see hit point FIG. 11b. In an embodiment of the invention the plate holders will be designed in a way so that the previous plate does not block for the main current direction of the water flow to the following plate in the rotation chain.

To translate the kinetic energy from the plates to rotational energy at the turbine shaft (7), the plates/flaps (1) are placed in a plate holder (2).

Advantages to the invention are that it utilizes the renewable energy represented by current in large water flows. At the same time, the invention is arranged to utilize the speed of the water along the complete length of the co-current flow side of the rotation chain. In an embodiment where a water spreading plow is arranged, the water pressure and the speed along the co-current pressure and speed will increase and thus also the effect. In an embodiment with the aslant arranged guiding walls towards the co-current side will further contribute to increasing the effect. At the same time, the water-spread plow walls will act as a protecting shield on the counter-current side and minimize the effect loss in the counter-current run.

The power plant will be a huge structure but a compact plant with all necessary support operations at the same structure. The power plant will be arranged far form land and utilize unused sea areas today and the risk of contamination is minimal compared to an oil platform. There is no need for land facility for receiving energy. All handling may take place at the support structure platform site. A good area of use for this plant is due to that the plant may be arranged far from land, without cable connection, to produce hydrogen gas. This is a high energy demanding process. The facility is also removable.

Figure 2:
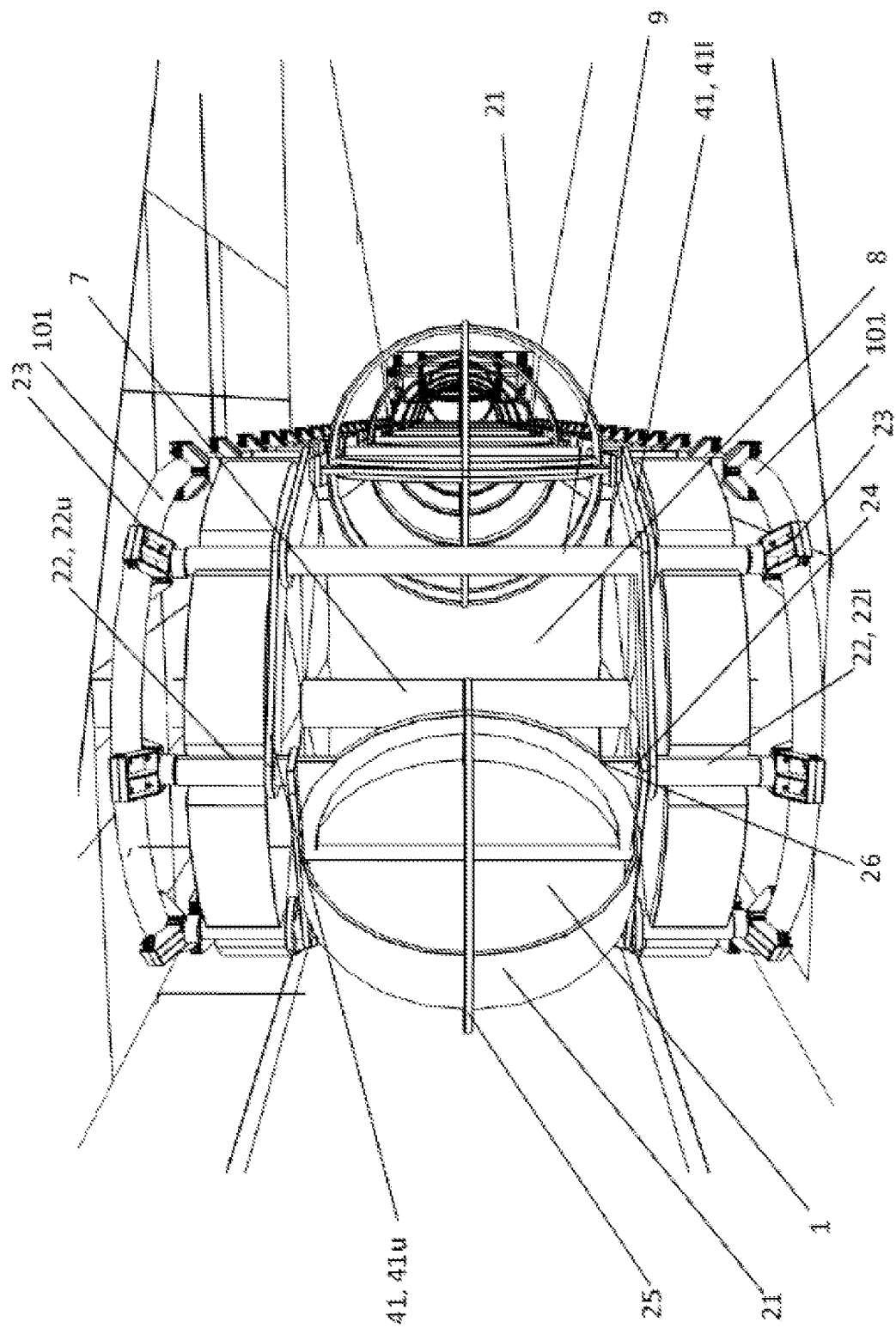
FIG. 2 is a perspective view of the same embodiment as shown in FIG. 1, in a rear view, counter-current direction and showing a plate holder (2) in turning position with plates (1) in a flowing direction, operating, closed position and a row of plate holders with plates in counter current, open, transport position.
Figure 3:
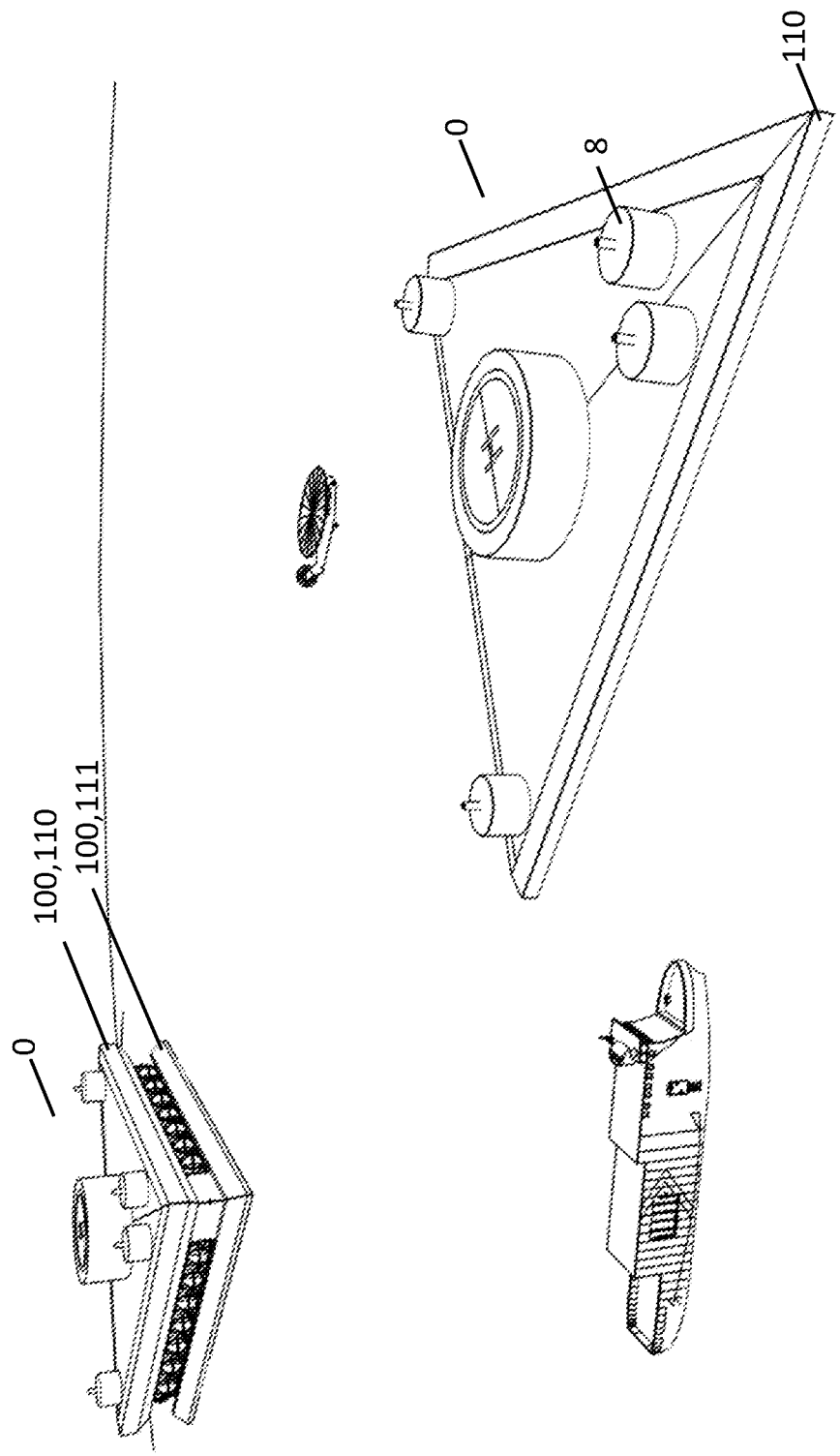
FIG. 3 is an illustration of 2 power plants according to the invention laid out into the sea, one being lowered to operating position and the other being in a surface position.

The ocean power turbine according to the invention comprises a partition wall (8) arranged along the path (B) of the web (B) inside the path (P) of the rotation chain (4) in the full height of the plates (2). Please see FIGS. 1 and 2.

The partitioning wall (8) is attached to the support structure (100) in a suitable position depending on the design of the support structure, and split the path (B) in an outer, co-current, side and an inner, counter-current, side. The partitioning wall (8) contributes to less water resistance in counter-current run by blocking the water flow between counter-current and co-current side.

In an embodiment of the invention the ocean power turbine the number of rotation chains (4) comprising plate holders (2) and plates (1) are two. Those chains are the drive parts of the turbine and oppositely arranged in a plow formation pointing against the main current direction (F) of the flow. Such design is advantageous due to a possible total streamlined assembly in the sea and that the two constitutes a powerplant and accommodating necessary support equipment, as anchor systems, transformer, control systems etc.

In an embodiment of the invention the ocean power turbine has a flow-protection and water-spreading plow (6) arranged in front of the rotation chain (4), relative to the current direction of the primary flow direction (F). Please see FIG. 1. This wall/plow (6) in leading edge of the structure and arranged towards the current protects the parts running counter-current. In addition, those wails guide the water favourable towards the moveable plates/flaps. Depending on the waters main current speed the angle may be calculated for the parted water flow to flow into parts of the plates at accelerated speed and will thus increase the turbine effect. In an embodiment with only one rotation chain (4) the plow may be splitting to only one side, i.e, angled only according to the waterflow at the side the rotation chain is arranged.

The wall/plow (6) together with the partitioning wall (8) will then as a total provide a good protection for the counter-current forces from the water when the plates turn and runs in counter current direction. In such partly closed structure there may also arise favourable turbulence behind the driving structure/conveyers/ "impeller" which may have opposite driving parts of the counter-current force from the main flow in the position where the plates run in closed position against the current.

In a full-scale embodiment of the invention the spreading plow will be of a size that it may accommodate for instance control rooms and monitoring windows.

In and embodiment of the ocean power turbine according to the invention the number of plates (1) in each plate holder (2) is at least two. The plates will be attached in a way that they may be tilted out in each side direction in co-current motion and be driven by the current and generate a force to the turbine. A stop arrangement will hold the plates in an unfolded position so they do not fold all the way around. See examples in FIG. 4c-e. In counter-current direction they will fold together against each other. I a special embodiment there might be one plate (1), In another embodiment, there may be more than two plates. Then they may be arranged on top of each other along a vertical axis, see FIG. 5.

In an embodiment of the invention the plate holder (2) has a circular frame structure (21) in the vertical direction of the frame structure (21) and holds two plates (1), each plate (1) being a half circle and accommodated within the frame structure (21) provided with the full diameter in the vertical direction and laterally pivotally attached to the frame structure in at least the upper and lower position of the plate (1) and with a stop device for the full open co-current position. Such a stop arrangement may also be arranged with shock absorbing details or material properties. Please see FIGS. 2 and 4 for details illustrating a circular beam/moulding in co-current direction to stiffening the structure, a circular beam/moulding perpendicular to this, wherein a stop arrangement for the plates may be arranged, and for stiffening the structure and a horizontal directed beam/moulding arranged at the largest diameter of the other two for stiffening purpose.

The ocean power turbine is in an embodiment further arranged with stiffening circular beams (25, 26).

A vertical axis in the centre may be arranged for strengthening, and for attachment purpose for the plates, according to one embodiment, but for another embodiment the plates may only be attached in their upper and lower position in the frame structure.

In and embodiment of the ocean power turbine according to the invention the plate holder (2) is cylindrical, open, and has an open rectangular shape in the vertical direction of the frame structure (21), see FIG. 5, and holds two or more plates (1) pivotally attached about associated horizontal shafts (27) further attached to a central shaft (29) fixed in the centre position of at least one upper and a lower retainer ring (28) in the upper and lower end of the frame structure (21) and the other end attached to one of one or more vertical beams (21v) in the frame structure (21). This may allow a high plate area and may be extended in the height upon desire.

These surface mounted frame structures constitute a robust structure and support for the turbine plates and contributes to low degree of maintenance according to plates standing free as generally known.

In and embodiment of the invention two or more plates (1) is arranged in height along the vertical axis (29), at each belonging horizontal axis (27). The frame structure is then generally stiffened by additional truss structure and by one or more intermediate holding rings. This provides an opportunity for a higher structure, which increases the turbine effect, at the same time limiting the plate sizes. This is beneficial among others when it comes to deformation of the plates.

According to an embodiment of the invention the ocean power turbine has a number of rotation chains (4) coupled to the multiple frame assemblies (21) are two, an upper rotation chain (4u) and a lower rotation chain (4l) with continuous chain linkages(41, 41u, 41l) and each frame structure (21) further coupled to the rotation chain (4) having at least one upper and lower coupling pin (22, 22u, 22l) running through chain linkage (41) and arranged for engagement in arranged recesses (51) in the outer circumference of the drive wheels (5) upon passage of these in operating mode. Two chains make good stability of the structure and an exact distance between the frame structure is favourable for further customisation of the connection pin to the drive wheels (5), see FIG. 2.

In an embodiment of the invention the plates are made of plastic, glass fibre, metal or another suitable material. The plates may be made of solid plates, be hollow, as a simple structure, or be made of several layers when there is a demand of high strength. The plates (1) may be manufactured as a sandwich structure in glass fibre or carbon to gain the correct strength.

Lowered in sea, the plates will have buoyancy. This is favourable to decrease the friction force. When the plates are not of a solid material they are conditions to take different pressures varying depending on water depth.

The ocean power turbine has in an embodiment stiffening bottom and top plate (24) in the running direction of the frame structure, and a coupling pin (22) is arranged in fore and rear position, accordingly, of the stiffening bottom or top plate (24) or both. The connection pins will be arranged in fore and rear end of both bottom and top plate (24) to engage both an upper and a lower arranged drive wheel (5). There might be embodiments with both upper and lower drive wheels, but with only in one of the positions as well. The connection pins are arranged for engagement with the drive wheel and in this way transfer the sea current, driving the rotation chain in the path, to the one or more turbines. The best and less stressful embodiment will be the one with upper and lower drive wheels.

In an embodiment of the invention guide rails (101) are coupled to said support structure (100) in the upper and lower positions of said coupling pins (22) throughout, the path of the rotation chain (B) and said coupling pins (22) are further provided with gripping and sliding devices (23) in upper and lower ends in sliding engagement with said guide rails (101) to hold and guide said plate holders (2) with plates (1) along said guide rails (101) in the path of the rotation chain. The guide rails (101) will be arranged between the drive wheel (5) and the support structure (100), please see FIG. 2. The plate holders (2) coupling pin (22) is equipped with wheels, sheaves, slide bearings, or another connection arrangement to a rail system with guide rails (101) for holding the plate holders in a defined path (B). This path is symmetric, equally formed in co- and counter-current direction. The rail system is designed in pipes, u-profiles or another design.

The plate holders (2) are linked to each other by a chain linkage (41) in a way that all the plate holders constitute a paired unit. The plate holders may alternatively be held together by a wire or the like.

The connection pins are arranged with wheels. The wheels having recesses being chain wheel like. The plate holder's axis extend into those recesses having the shape of a chain.

The main shafts, where the rotational energy is transferred, is arranged with equipment for utilizing the rotational energy. The main shafts are attached to the main structure. This with ball bearings, slide bearings or other.

For an even and proper drive path with desired distance between the plate holders, there is in an embodiment of the ocean power turbine arranged a coupling pin (9) through a chain linkage (41) in both the upper and lower rotation chains (4u, 4l) and with a gripping and sliding device (23) at each end.

The plates (1), in an embodiment of the invention, may be a hollow structure and provided with a valve arrangement for pressure compensation. They contribute to the buoyancy to the total structure and will not collapse at high pressures or vice versa.

The ocean turbine, according to the invention, has a support structure being a floating platform arranged for anchoring to the sea bed.

In an embodiment the support structure (100) is sub divided into a top section (110) and a bottom section (111) respectively above and below the operating structure (1,2, . . . ). The min structure (100)/the frame, may be in two parts, the lower part for being submersed deeper than the upper. The top portion of the frame is called the "top platform" (110), while the lower is called the "bottom platform" (111). Both top and bottom platforms will have buoyancy tanks. The top platform may float at the water surface while the bottom platform is submersed. All with connection arrangements between the top and bottom platform by chains, ropes or others, connected to a winch system. Either top and bottom platform, or both, may be anchored to the sea, ocean or river bed.

In an embodiment of the invention the outer walls of the top section (110) and bottom section (111) have a sloping at least lower wall portion against the operating structure (1,2, . . . ). The operating structure (1,2, . . . ), comprises at least rotation chains, plate holders, drive wheel and turbine shafts. The aslant wall portion will guide the water towards the plates and increase the water current and thus the power to the plates and further the effect to the turbine.

The top platform may also be submerged below sea surface, but utilizes its buoyancy to hold the energy transport chain/the impeller in right position. The total structure is anchored in a suitable way, for example by spreading anchor as for a drill rig etc.

The invention also comprises a stop system for turbines with tiltable arranged plates. In an embodiment of the invention the ocean power turbine is arranged with a stop system with a device (200) adapted to hold the plates (1)

forced in the closed position. During operation, the plates will open and fold in co current and counter current position depending on their position in the path, and driven by the water flow. If the power plant due to a reason, emergency or planned maintenance, must be stopped, it is to decrease power impact from the water current, to hold the plates in a voided, closed, position and not in a driving position. Please see FIGS. 12a-14c, Common to the embodiments of the invention comprising rectangular plate systems is that in an embodiment of such stop system the device (200) further comprises at least one actable lifting beam (201) in the support structure (100, 8) and a manipulator arm (202) for directly or indirectly engaging the plates (1). The lifting beam is arranged to, on a signal, be lifted vertically or horizontally out of base position to a activating position, for example by use of hydraulics, for the manipulator arm to be moved in a vertical or horizontal direction, independent of the lifting balks position, and in turn, keep the plates in an open position, directly or indirectly.

In an embodiment of the invention where circular plateholders (2) and half-moon shaped plates the lifting beam (201) of the supporting structure (100, 8) of the device (200) is disposed near the turning point of the web at the end of the countercourse lane half and arranged to actuate the manipulator arm (202) further in contact with a release mechanism (204) and a plate gripper(210), wherein the plate gripper is adapted to grip the plates (1) in the closed counter-current position by means of a gripping aperture (211) in the plate gripper (210). Please see FIGS. 13a-14c. The plate gripper is movable arranged in a plate holder (2) attached in rear end of the horizontal circular beam in the plate holder (2).

An embodiment with this stop system has the lifting beam (201) arranged under the plate holder system in the support structure in the end of a counter current path. When activating the stop system, the lifting beam (201) lifts the manipulator arm (202). The manipulator arm is further connected to a release mechanism with a tilting arm lifting a locking arrangement in the release mechanism so the plate gripper is activated by a spring tension, please see detail of FIGS. 14a-c, and thus moving the plate gripper towards the open plates and the gripper recess will position in an engaging position about the plates (1).

In another embodiment with the stop system for a circular plate system is the lifting beam (201) arranged in the partitioning wall (8) in the support structure (100) in the end of a counter current path. When activation the stop system, the beam (201) is lifted out of, thus the manipulator arm (202) moves in a horizontal direction. The manipulator arm is further connected to a release mechanism with a spring tensioned locking mechanism in the release mechanism, the manipulator arm activates the locking device by a horizontal motion, thus activating the plate gripper using the spring tensioned plate gripper, please see detail in FIGS. 13a-d, and thus moving the plate gripper towards the open plates and the gripper opening will position in an engagement position about the plates (1).

For embodiments of the invention using rectangular plates a stop system is used wherein the device (200) is arranged with at least 2 lifting beams (201) in the support structure (100) and wherein the lifting beams (201) are disposed throughout the entire row of plate holders throughout the rotational path of the operating arrangement, and wherein the lifting beam (201) further is arranged to actuate the manipulator arm (202) further directly connected to the one or more plates (1) in height via a hinged coupling (212) and adapted to lift the plates (1) to open position. This requires at least added force if the lifting beam is segmented and arranged to lift the first segment at an area close to the rotation drive wheel and at counter current side of this and in turn lifting of segments successively the next plate holder previously positioned at the first lifted segment when the plate holder moves on in the rotation chains path until this has run a complete round and the chain has stopped. This stop system may easily be deactivated by lowering the lifting beam, and the turbine will start up.

For all the stop system embodiments, the point of contact between the lifting beam and the manipulator arm will be arranged with a sliding arrangement such as a sliding wheel (203) to minimize the friction and preventing wear. Above the rotating drive wheels, a movable activatable guide rail system will be arranged to support the manipulator arms when rounding the drive wheels. This is a need for the rectangular plate systems wherein the plates are held in open position bay the means of the lifting beam and the manipulator arm without another, gripping arrangement. The mentioned stop systems above, are not dependent on wireless communication.

In an embodiment of the invention for the system of rectangular plates, the lifting beam may be replaced by a motor and a lifting arrangement, such as a threaded sleeve engaging a threaded portion of the manipulator arm (202). The motor should be connected to the arrangement for receiving a control signal for wireless communication and remote control. The motor may be placed in the lower edge and outside the plate holder and be independent of an additional beam system.

For embodiment of the invention using circular plate holders (2) one may use the device (200) to hold the plates (1) in closed position, comprising a screw motor (206) placed at the holder (205). The motor is in engagement with a first end of a treaded rod (207), wherein the second end of the rod is attached to the plate gripper (210), thus, running the motor, the plate gripper will be moved in or out of an engagement with the plates (2). An advantage to such plate gripper is that it may be run in two directions; closing and opening. The stop system is in this embodiment arranged with a battery pack, battery operation and arrange for receiving a control signal for wireless communication and remote control. Please see FIG. 15.

For embodiments of the invention using circular plate holders (2) an embodiment of the device (200) to hold the plates (1) in closed position comprise an electromagnet (208) arranged on each flap, and in an embodiment in recesses in each flap. Please see FIG. 16. The plate (1) or the plate holder need an incorporated battery charged in service position. This may be arranged together with a receiver for a control signal for wireless communication and remote control, possibly in the plates recess and arranged to activate and deactivate the magnet (208) by a wireless of/on button, and the plates may open and close on demand. This will be a simple and little space demanding arrangement to hold the plates in a forced closed position.

The device (200) to hold the plates (1) in a closed position may in an embodiment of the invention comprise a combination of electro magnet (208) and a screw motor (206) with its belonging positioning holder, rod and plate gripper in the way this is used in a separate arrangement. Then the magnet will be activated at a stop signal and towards the end of a closed path turn counter current, and the screw motor may be activated at a later time to possibly hold the plates together over a longer period.

The stop system arrangements mentioned above may with minimal adjustments of the holder and the positioning of the magnet be used for other types of plate turbines with tiltably arranged plates.

In an embodiment of the invention the plant is arranged with cleaning systems for cleaning of the chains, plate holders and plates and for instance be run when the plant is lifted to a maintenance position. This may for instance be a high-pressure cleaning system for each plate holder, or an arrangement for each rotation chain and the drive wheel is rotated for a sequence wash for all the plate holders to pass a cleaning position to be cleaned.

All pipe structures will advantageously be air filled so that they also contribute to buoyancy of the structure and to reduced friction on the sliding system. All air pipes must have pressure valves for adjustment and safety against pressure variations. All surrounding support function, generator system, operator and service function, etc. for operation of the power plant may be located on top of the top section/top float of the support structure.

The invention claimed is:

1. An ocean power turbine for converting a slow water flow energy comprising
    two endless rotation chains having a plurality of plate holders arranged in said two endless rotation chains, each of said plurality of plate holders comprising at least one plate attached therein,
    wherein:
    each endless rotation chain runs in an extended path around and engages with at least one drive wheel in one end arch of said extended path via at least one engagement device comprising at least one pair of upper and lower coupling pins,
    each of said at least one plate is pivotably attached to a corresponding one of said plurality of plate holders to switch between an open position with a primary flow direction of water flow and a closed position towards said primary flow direction,
    said at least one drive wheel has a turbine shaft coupled to a generator device for utilizing a rotational energy,
    said extended path of each endless rotation chain is slanted relative to said primary flow direction of the water flow, arranged in a fully or partially submersible support structure,
    the two endless rotation chains comprising said plurality of plate holders are oppositely arranged in a plow formation,
    said fully or partially submersible support structure comprises a partition wall arranged along said extended path of a web inside said extended path of said each endless rotation chain in a full height of said at least one plate,
    said fully or partially submersible support structure is sub divided into a top section and a bottom section respectively above and below an operating structure, outer walls of said top section comprise at least a sloping lower wall portion towards the operating structure, and outer walls of said bottom section comprise at least a sloping upper wall portion towards the operating structure,
    said at least a sloping lower wall portion, said at least a sloping upper wall portion and together with the partition wall form a lateral concave duct for guiding water towards said at least one plate and increase water current in a slow water flow and thus power to said at least one plate and further power to said ocean power turbine, and
    wherein each of said plurality of plate holders has a circular frame structure in a vertical direction of said circular frame structure and holds the at least one plate, each of the at least one plate being a half circle and accommodated within the circular frame structure provided with a full diameter in the vertical direction and laterally pivotally attached to the circular frame structure in at least an upper and lower position of the at least one plate and with a stop device for a full open co-current position.

2. The ocean power turbine according to claim 1, wherein, in said primary flow direction, a flow-protection and water-spreading plow is arranged in front of said two endless rotation chains.

3. The ocean power turbine according to claim 1, wherein the at least one plate comprises at least two plates.

4. The ocean power turbine according to claim 1, wherein each endless rotation chain includes an upper rotation chain, coupled to an upper portion of multiple frame structures, and a lower rotation chain, coupled to a lower portion of said multiple frame structures, with continuous chain linkages, and
    wherein each of said multiple frame structures is further coupled to two endless rotation chains having said at least one pair of upper and lower coupling pins running through said continuous chain linkages and arranged for engagement in an outer circumference of said at least one drive wheel upon passage in an operating mode.

5. The ocean power turbine according to claim 4, wherein guide rails are coupled to said fully or partially submersible support structure in the at least one pair of upper and lower coupling pins throughout the extended path of each endless rotation chain, and
    wherein said at least one pair of upper and lower coupling pins are further provided with gripping and sliding devices in upper and lower ends in sliding engagement with said guide rails to hold and guide said plurality of plate holders with said at least one plate along said guide rails in the extended path of each endless rotation chain.

6. The ocean power turbine according to claim 4, wherein each of said multiple frame structures is further provided with stiffening bottom and top plates in a running direction of each of said multiple frame structures, and said at least one pair of upper and lower coupling pins are provided in front and rear positions of the stiffening bottom and top plates respectively.

7. The ocean power turbine according claim 1, wherein the frame structure is further provided with stiffening circular rails.

8. The ocean power turbine according to claim 1, wherein said at least one endless rotation chain includes an upper rotation chain and a lower rotation chain, and a coupling pin is arranged through a chain linkage in both said upper and lower rotation chains and with a gripping and sliding device at each end.

9. The ocean power turbine according to claim 1, wherein each of the at least one plate is a hollow structure and equipped with pressure compensation means.

10. The ocean power turbine according to claim 1, wherein said fully or partially submersible support structure is a floating platform for anchoring to a seabed.

11. The ocean power turbine according to claim 1, wherein said at least one plate in each of the plurality of plate holders is held forced in the closed position.

12. The ocean power turbine according to claim 11, further comprising at least one actuatable lifting beam in the fully or partially submersible support structure and a manipulator arm for directly or indirectly engaging each of the at least one plate.

13. The ocean power turbine according to claim 12, wherein at least one actuatable lifting beam of the fully or partially submersible supporting structure is disposed near a turning point of a web at an end of a countercourse lane half and arranged to actuate the manipulator arm further in contact with a release mechanism and a plate gripper, and
    wherein the plate gripper is adapted to grip the at least one plate in a closed counter-current position by means of a gripping aperture in the plate gripper.

14. The ocean power turbine according to claim 12, wherein a device is arranged with at least two actuatable lifting beams in the fully or partially submersible support structure,
    wherein the at least two actuatable lifting beams are disposed throughout row of the plurality of plate holders throughout a rotational path of an operating arrangement, and
    wherein the at least two actuatable lifting beams are further arranged to actuate the manipulator arm further directly connected to the at least one plate in height via a hinged coupling and adapted to lift the at least one plate to the closed counter-current position.

15. The ocean power turbine according to claim 1, wherein said plurality of plate holders have a surface mounted frame structure in a perimeter of blades.

\* \* \* \* \*